US012668084B2

(12) United States Patent
Zhang

(10) Patent No.: US 12,668,084 B2
(45) Date of Patent: Jun. 30, 2026

(54) HOOK ARM COMPONENT AND HOOK ASSEMBLY WITH STORAGE FUNCTION

(71) Applicant: Jiajie Zhang, Lianyungang (CN)

(72) Inventor: Jiajie Zhang, Lianyungang (CN)

( * ) Notice: Subject to any disclaimer, the term of this patent is extended or adjusted under 35 U.S.C. 154(b) by 279 days.

(21) Appl. No.: 18/679,135

(22) Filed: May 30, 2024

(65) Prior Publication Data

US 2025/0332873 A1 Oct. 30, 2025

(30) Foreign Application Priority Data

Apr. 24, 2024 (CN) ......................... 202420876096.7

(51) Int. Cl.
*B60D 1/06* (2006.01)

(52) U.S. Cl.
CPC .................................... *B60D 1/065* (2013.01)

(58) Field of Classification Search
CPC . B60D 1/065; B60D 1/58; B60D 1/60; B60D 1/06
See application file for complete search history.

(56) References Cited

U.S. PATENT DOCUMENTS

| | | | |
|---|---|---|---|
| 6,581,953 B2 * | 6/2003 | Jerry | B60D 1/52 |
| | | | D12/162 |
| 7,156,412 B2 | 1/2007 | Andersen | |
| 7,347,441 B2 | 3/2008 | Rosario | |
| 8,079,611 B2 | 12/2011 | Schroeder | |
| 10,391,825 B2 | 8/2019 | Cincunegui | |
| 11,312,192 B1 | 4/2022 | Wipf | |
| 11,660,918 B1 * | 5/2023 | Yan | B60D 1/36 |
| | | | 280/507 |
| 2004/0150205 A1 * | 8/2004 | DeAnda | B60R 9/06 |
| | | | 280/769 |
| 2006/0290103 A1 * | 12/2006 | Kottke | B60D 1/36 |
| | | | 280/511 |
| 2024/0416695 A1 * | 12/2024 | Doman | G01G 19/02 |

* cited by examiner

*Primary Examiner* — Drew J Brown
(74) *Attorney, Agent, or Firm* — Nitin Kaushik

(57) ABSTRACT

The present disclosure provides a hook arm component with storage function, which includes a hook arm. One end of the hook arm is configured to connect to a vehicle body, and another end of the hook arm is provided with a hook. The hook arm is configured to connect to the vehicle body. A cavity is provided on one side of the hook arm configured to connect the vehicle body, and a storage box is provided inside the cavity. One end of the storage box is fixedly connected with a connector, and the storage box is detachably limited and clamped to the inside of the hook arm through the connector.

20 Claims, 4 Drawing Sheets

HOOK ARM COMPONENT AND HOOK ASSEMBLY WITH STORAGE FUNCTION

CROSS-REFERENCE TO RELATED APPLICATIONS

This application claims priority benefits to Chinese Patent Application No. 2024208760967, filed Apr. 24, 2024, the contents of which are incorporated herein by reference.

TECHNICAL FIELD

The present disclosure relates to the technical field of automotive technologies, and in particular, to a hook arm component and a hook assembly with storage function.

BACKGROUND

When a driver parks his/her car outdoors, he/she occasionally encounter a situation where the vehicle is smashed or stolen and valuable belongings are lost. The loss of some valuables such as spare keys may cause great trouble in daily life. General storage ways are more likely to attract people's attention, and the possibility of losing the belongings inside is higher. It is safer to store the above valuable belongings inside an accessory of a common vehicle. The structure of a vehicle hook is suitable for storage, but a common vehicle hook does not have the storage function. If the belongings are simply stored inside the vehicle hook, they may also become damp and damaged, etc.

SUMMARY

A hook arm component with storage function includes a hook arm, one end of the hook arm is configured to connect with a vehicle body, and another end of the hook arm is provided with a hook. The hook arm has a cavity, a storage box is provided in the cavity, and one end of the storage box is fixedly connected with a connector, and the storage box is detachably accommodated inside the hook arm through the connector.

A hook assembly with storage function includes the hook arm component with storage function described above.

BRIEF DESCRIPTION OF DRAWINGS

The description and drawings are provided for a better understanding of the present disclosure. The illustrative embodiments and their descriptions are used to explain but do not constitute an improper limitation of the present disclosure.

Figure 1:
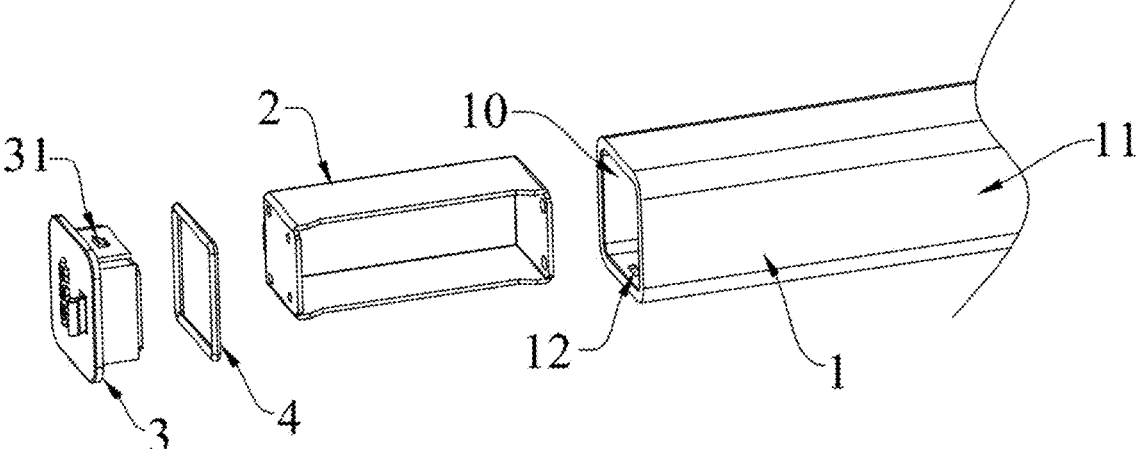
FIG. 1 is a schematic structural view of a hook arm component with storage function according to an embodiment.

Reference signs: 1—Hook arm; 10—cavity; 11—through hole; 12—limiting groove; 13—baffle; 2—storage box;

3—connector; 31—clip key; 4—first sealing ring; 5—second sealing ring; 6—sinking arm; 7—ball head; 8—plug.

DETAILED DESCRIPTION OF THE EMBODIMENTS

The present disclosure will be described in detail below with reference to the accompanying drawings and embodiments. Each example is provided to explain but not as a limitation of the present disclosure. It will be apparent to those skilled in the art that modifications and variations may be made without departing from the scope or spirit of the present disclosure. For example, features shown or described as part of one embodiment may be used on another embodiment, to yield yet another embodiment. It is therefore intended that the present disclosure cover such modifications and variations as come within the scope of the appended claims and their equivalents.

In the description of the present disclosure, orientations or positional relationships indicated by terms "longitudinal", "transversal", "upper", "lower", "front", "back", "left", "right", "vertical", "horizontal", "top", "bottom", etc., are based on the orientations or positional relationships shown in the drawings. They are only for the convenience of describing and do not require that the present disclosure must be constructed and operated in a specific orientation. Therefore, it cannot be understood as limitations on the present disclosure. Terms "connected", "connecting" and "arranged" used in the present disclosure should be understood in a broad sense. For example, it may be a fixed connection or a detachable connection; it may be a direct connection or an indirect connection through an intermediate component; it may be a wired electrical connection, a radio connection, or a wireless signal connection. For those skilled in the art, the specific meaning of the above terms may be understood according to the specific situation.

One or more examples of the disclosure are illustrated in the accompanying drawings. The detailed description uses numerical and letter signs to refer to features in the drawings. In the drawings and description, reference signs or the like have been used to refer to similar parts of the present disclosure. As used herein, terms "first," "second," "third" and the like are used interchangeably to distinguish one component from another and are not intended to denote the position or importance of individual components.

As shown in FIG. 1 to FIG. 5, according to an embodiment of the present disclosure, a hook arm with storage function is provided. The hook arm with storage function includes a hook arm 1. One end of the hook arm 1 is configured to connect to a vehicle body, and another end of the hook arm 1 is configured to connect a hook. One side for connecting to the vehicle body of the hook arm 1 is provided with a cavity 10. A storage box 2 is provided inside the cavity 10. One end of the storage box 2 is fixedly connected with a connector, and the storage box 2 is detachably limited and clamped inside the hook arm 1 through the connector. In some embodiments, two removable snap-in keys 31 are disposed on two sides of the connector 3, and two limiting grooves 12 are respectively defined inside the hook arm 1 corresponding to the positions of the two snap-in keys 31. When the storage box 2 is inserted inside the hook arm 1, the two snap-in keys 31 are locked into the corresponding limiting grooves 12, such that the storage box 2 is detachably limited and locked into the inside of the hook arm 1. A password lock is provided on the connector 3. As shown in FIG. 1, the password lock controls the ejection or retraction of the two snap keys 31. The password lock increases anti-theft function of the storage box 2. Similarly, other locking structures may also be provided on the connector 3, such as locks with keys, fingerprint locks, and other structures that may realize the detachable limiting connection between the storage box 2 and the hook arm 1 and have the anti-theft function. Alternatively, the connector 3 may be arranged to a structure without anti-theft function, and the detachable limiting connection between the storage box 2 and the hook arm 1 may also be realized. The above-mentioned connector structure with anti-theft function and the structure without anti-theft function may also be realized. The specific structure of the connector may be implemented according to actual needs and will not be described again here.

Figure 2:
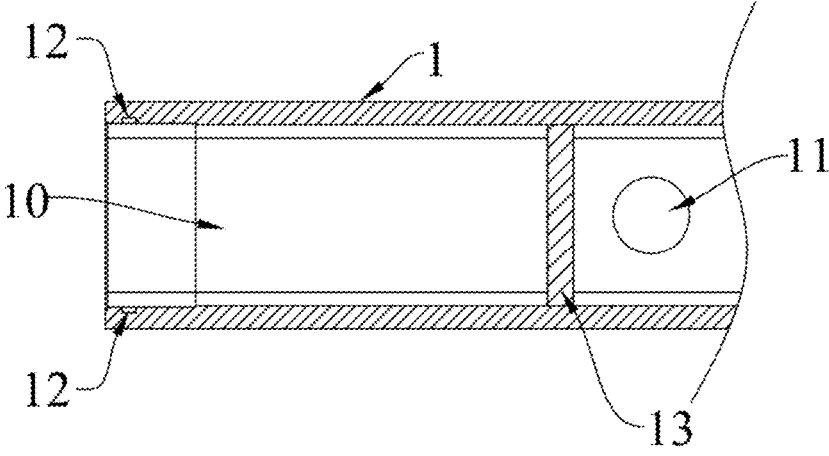
FIG. 2 is a schematic cross-sectional structural view of a baffle arranged inside a hook arm of a hook arm component with storage function according to an embodiment.

In some embodiments, as illustrated in FIG. 2, the storage box 2 is defined with an opening facing a sidewall of the hook arm. The storage box 2 may include three sidewalls connected in sequence to form a structure of a square cylindrical shape. The opening is formed between two sidewalls opposite to each other of the storage box 2, and faces a sidewall of the hook arm. Therefore, the opening is convenient for an user to take out and put in his/her belongings.

In some embodiments, the interior of the hook arm 1 also has a waterproof function. The cavity 10 is a closed space with an only opening for the insertion of the storage box 2. The connector 3 is also provided with a first sealing ring 4. When the connector 3 connects the storage box 2 to the inside of the hook arm 1, the cavity 10 is closed and sealed, thereby realizing the waterproof function inside the hook arm 1 and reducing the possibility of the belongings placed inside the storage box 2 being soaked in water, getting damp, etc.

The present disclosure also provides a hook assembly, which includes the above-mentioned hook arm component with storage function and the hook. The hook is arranged on one end of the hook arm 1 away from the cavity 10. The hook arm 1 is also defined with a through hole 11, and a plug 8 is mounted inside the through hole 11 for connecting with a bumper of the vehicle or connecting to the bumper of the vehicle through a base. A second sealing ring 5 is provided at the connection position between the through hole 11 and the plug 8 for waterproofing the internal cavity 10 of the hook arm 1. In addition, a baffle 13 may also be provided inside the hook arm 1 to isolate the space between the cavity 10 and the through hole 11 to ensure the sealing of the cavity 10.

Figure 3:
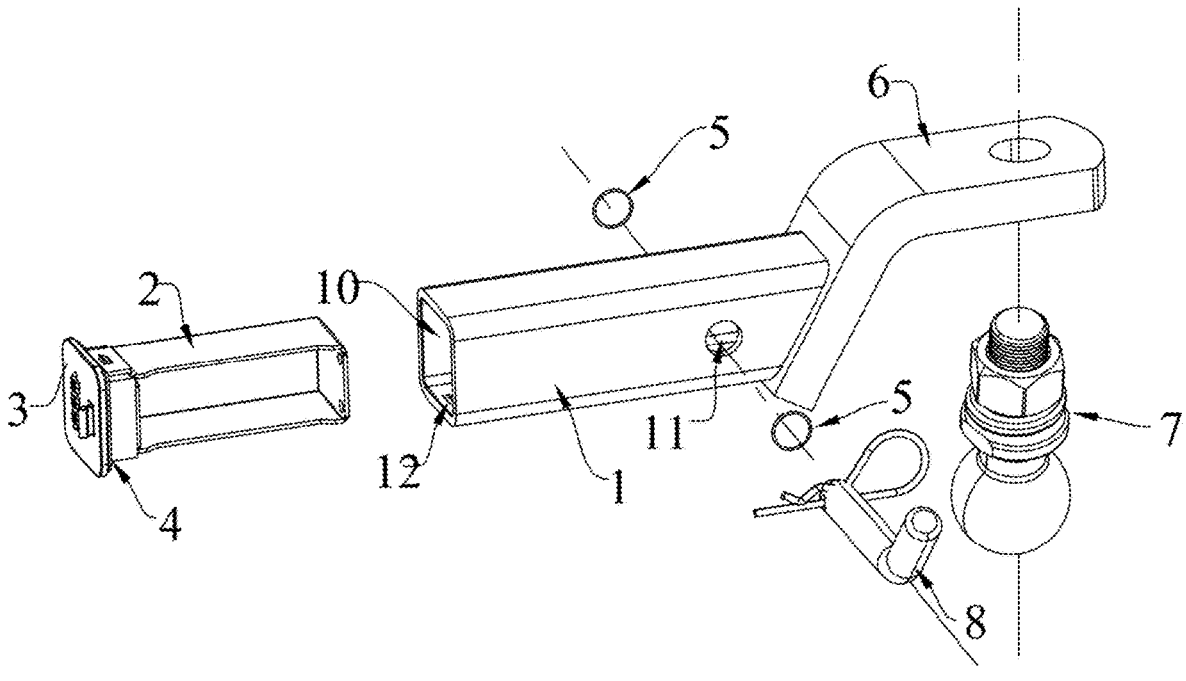
FIG. 3 is a schematic view of a partially disassembled hook arm component with storage function according to an embodiment.
Figure 4:
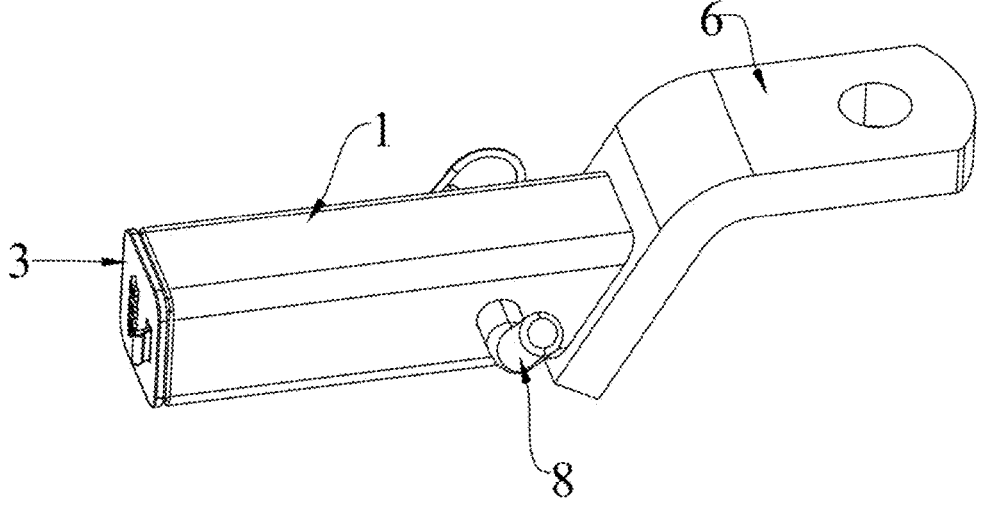
FIG. 4 is a schematic view of an assembled hook arm component with storage function (excluding a ball head) according to an embodiment.

In some embodiments, as illustrated in FIG. 3, the number of the second sealing ring 5 is two, and each of the two the second sealing rings 5 is respectively arranged on each of two connection positions between the through hole 11 and the plug 8. Therefore, the waterproofing effect of the cavity 10 of the hook arm 1 may be improved.

In some embodiments, the plug 8 may be an ordinary plug or a locking plug. The locking plug may realize the anti-theft function of the hook assembly. The specific method may be implemented according to actual needs and will not be described again here.

In some embodiments, one end of the hook arm 1 away from the cavity 10 is provided with a hook. The hook includes a sinking arm 6 and a ball head 7. One end of the sinking arm 6 is fixedly connected to the hook arm 1. Another end of the sinking arm 6 is detachably connected to the ball head 7, or the sinking arm 6 and the ball head 7 are designed as one piece. In addition, the hook may also be configured as an ordinary arc hook or a tiger head hook, both of which may realize the function of the hook.

From the above description, it may be seen that the above-mentioned embodiments of the present disclosure achieve the following technical effects.

1. The storage box is provided in the hook arm to realize the storage function of the hook arm.

2. The storage box and the hook arm are connected through an anti-theft lock to realize the anti-theft function of the storage box.

3. The cavity is a closed structure with only one end opened. The gap between the hook arm and the connector is sealed by a sealing ring to achieve sealing inside the cavity and the possibility of the storage box in the cavity being immersed in water and getting damp is reduced.

4. The hook assembly is equipped with a plug to realize the anti-theft function of the hook arm assembly.

Compared with the related art, the hook arm component and the hook assembly with storage function of the present disclosure may store belongings in an inconspicuous position on the vehicle, reduce the risk of theft, have a stable structure and have waterproof and anti-theft function, therefore more reliable to use.

The above are only some embodiments and are not intended to limit the present disclosure. For those skilled in the art, the present disclosure may have various modifications and changes. Any modifications, equivalent substitutions, improvements, etc., made within the spirit and principles of the present disclosure shall be included in the protection scope of the present disclosure.

What is claimed is:

1. A hook arm component with storage function, comprising a hook arm, one end of the hook arm is configured to connect with a vehicle body, and another end of the hook arm is configured to connect a hook,
wherein the hook arm has a cavity, a storage box is provided in the cavity, one end of the storage box is fixedly connected with a connector, and the storage box is detachably accommodated inside the hook arm through the connector.

2. The hook arm component with storage function according to claim 1, wherein the connector is provided with a snap-in key, the hook arm is provided with a limiting groove corresponding to the position of the snap-in key, and the connector is detachably connected to the hook arm through the cooperation between the snap-in key and the limiting groove.

3. The hook arm component with storage function according to claim 2, wherein the connector is also provided with a password lock, and the password lock is capable of controlling the ejection or retraction of the snap-in key.

4. The hook arm component with storage function according to claim 1, wherein the cavity is a closed structure with an opening defined at one end, a first sealing ring is provided between the connector and the hook arm, and the storage box is accommodated within the hook arm through the connector to seal the cavity.

5. The hook arm component with storage function according to claim 1, wherein the hook arm is also provided with a through hole, and a plug is arranged inside the through hole.

6. The hook arm component with storage function according to claim 5, wherein the plug is a plug with a locker.

7. The hook arm component with storage function according to claim 5, wherein a second sealing ring is provided at the connection position between the through hole and the plug.

8. The hook arm component with storage function according to claim 5, wherein a baffle is provided inside the hook arm to isolate the cavity and the through hole.

9. The hook arm component with storage function according to claim 5, wherein the storage box is defined with an opening facing a sidewall of the hook arm.

10. The hook arm component with storage function according to claim 7, wherein the number of the second sealing ring is two, and each of the two the second sealing rings is respectively arranged on each of two connection positions between the through hole and the plug.

11. A hook assembly with storage function, comprising a hook arm component with storage function and a hook, wherein the hook arm component with storage function comprises a hook arm, one end of the hook arm is configured to connect with a vehicle body, and another end of the hook arm is connected to the hook, and the hook arm has a cavity, a storage box is provided in the cavity, one end of the storage box is fixedly connected with a connector, and the storage box is detachably accommodated inside the hook arm through the connector.

12. The hook assembly with storage function according to claim 11, wherein the hook comprises a sinking arm and a ball head, one end of the sinking arm is connected to the other end of the hook arm, and another end of the sinking arm is detachably connected to the ball head.

13. The hook assembly with storage function according to claim 11, wherein the connector is provided with a snap-in key, the hook arm is provided with a limiting groove corresponding to the position of the snap-in key, and the connector is detachably connected to the hook arm through the cooperation between the snap-in key and the limiting groove.

14. The hook assembly with storage function according to claim 13, wherein the connector is also provided with a password lock, and the password lock is capable of controlling the ejection or retraction of the snap-in key.

15. The hook assembly with storage function according to claim 11, wherein the cavity is a closed structure with an opening defined at one end, a first sealing ring is provided between the connector and the hook arm, and the storage box is accommodated within the hook arm through the connector to seal the cavity.

16. The hook assembly with storage function according to claim 11, wherein the hook arm is also provided with a through hole, and a plug is arranged inside the through hole.

17. The hook assembly with storage function according to claim 16, wherein the plug is a plug with a locker.

18. The hook assembly with storage function according to claim 16, wherein a second sealing ring is provided at the connection position between the through hole and the plug.

19. The hook assembly with storage function according to claim 16, wherein a baffle is provided inside the hook arm to isolate the cavity and the through hole.

20. The hook assembly with storage function according to claim 16, wherein the storage box is defined with an opening facing a sidewall of the hook arm.

* * * * *